United States Patent [19]

Wagner

[11] Patent Number: 4,781,019
[45] Date of Patent: Nov. 1, 1988

[54] KEEL-RIB COOLANT CHANNELS FOR ROCKET COMBUSTORS

[75] Inventor: William R. Wagner, Los Angeles, Calif.

[73] Assignee: Rockwell International Corporation, El Segundo, Calif.

[21] Appl. No.: 70,638

[22] Filed: Jul. 8, 1987

Related U.S. Application Data

[63] Continuation of Ser. No. 481,550, Apr. 4, 1983, abandoned.

[51] Int. Cl.⁴ .............................................. F02K 9/00
[52] U.S. Cl. ........................................ 60/260; 60/267
[58] Field of Search ............... 60/260, 267, 730, 736; 165/169

[56] References Cited

U.S. PATENT DOCUMENTS 3,154,914 11/1964 Stöckel .................................. 60/260

FOREIGN PATENT DOCUMENTS 459924 1/1937 United Kingdom .................. 60/260

Primary Examiner—Louis J. Casaregola
Assistant Examiner—Donald E. Stout
Attorney, Agent, or Firm—H. Fredrick Hamann; Harry B. Field; Lawrence N. Ginsberg

[57] ABSTRACT

The present invention provides a regeneratively cooled rocket combustor comprising a combustor wall, a plurality of coolant channels extending through the combustor wall and at least one keel-rib extending into each coolant channel from the channel roof and which is bounded on both of its sides by arcuate flutes for providing smooth and continuous surface transition between the keel-rib and adjoining interior surfaces of the coolant channel.

4 Claims, 5 Drawing Sheets

U.S. Patent  Nov. 1, 1988  Sheet 1 of 5  4,781,019
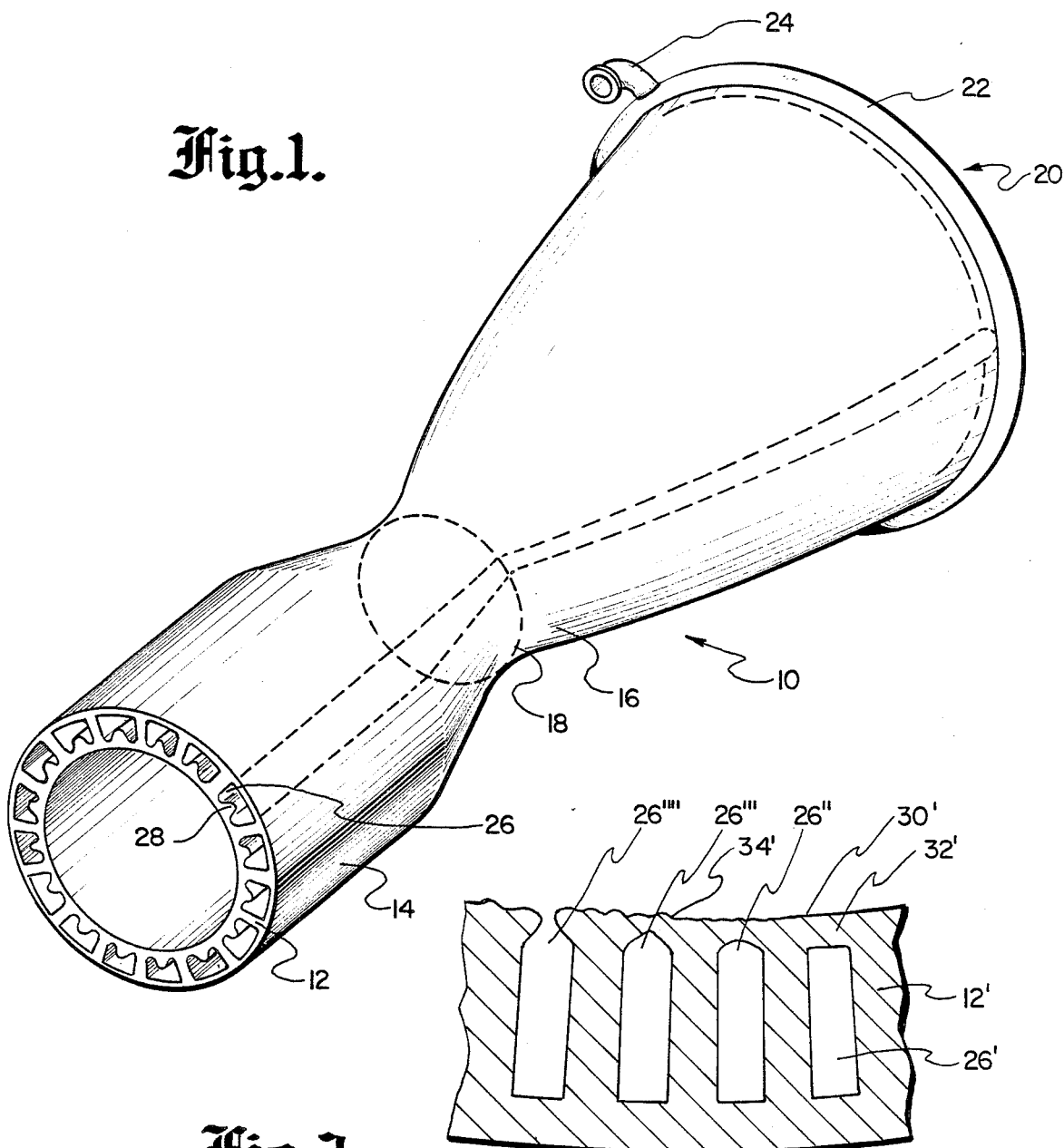
Fig.1.
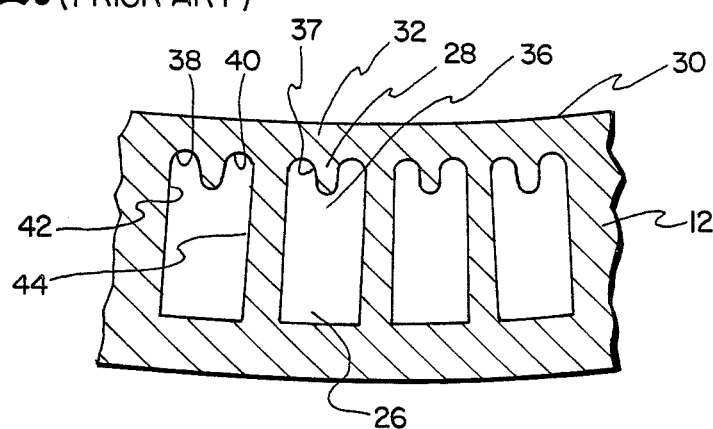
Fig.2. (PRIOR ART)
Fig.3

| 929 | 929 | 931 | 934 | 938 | 943 | 952 | 958 | 961 |
|---|---|---|---|---|---|---|---|---|
| 719 | 720 | 722 | 726 | 731 | 737 | 743 | 757 | 762 |
| 503 | 503 | 516 | 514 | 523 | 531 | 551 | 564 | 569 |
| 275 | 274 | 269 | 300 | 322 | 318 | 362 | 387 | 395 |
| 135 | 132 | 124 | | | 68 | 123 | 155 | 155 |
| 17 | 12 | -4 | | | -51 | -14 | 7 | 15 |
| -61 | -65 | -7 | | | -116 | -93 | -79 | -74 |
| -111 | -114 | -122 | | | -151 | -138 | -130 | -127 |
| -142 | -143 | -149 | | | -171 | -163 | -158 | -157 |
| -159 | -160 | -164 | | | -182 | -177 | -175 | -174 |
| | | | | | -188 | -185 | -183 | -182 |
| -195 | -195 | -194 | -194 | -193 | -191 | -189 | -187 | -186 |
| -192 | -192 | -192 | -191 | -191 | -191 | -190 | -190 | -189 |
| -191 | -191 | -191 | -191 | -191 | -191 | -190 | -190 | -190 |

KEEL-RIB COOLANT CHANNELS FOR ROCKET COMBUSTORS

This application is a continuation of application Ser. No. 481,550 filed 04/04/83, now abandoned.

BACKGROUND OF THE INVENTION

1. Field of the Invention

This invention relates generally to rocket motors and more particularly to regeneratively cooled rocket combustors.

2. Description of the Prior Art

Regenerative cooling in liquid-propellant rocket combustors is a widely applied method for improving the capability of their combustor walls to withstand high combustion temperatures and heat transfer rates. The method commonly feeds one or possibly both of the propellants through channels in the thrust chamber wall for cooling purposes before they are injected into the combustion chamber. In one generally accepted design, these channels are formed by constructing an inner liner from a collection of mutually adjoined tubes to form a tube wall combustor. In another design, a series of spaced apart, longitudinally extending grooves are machined into the exterior surface of the inner combustor liner whereupon an outer liner is formed thereover. As a result of the latter technique, the combustor presents smooth inner walls for defining the interior of the combustion chamber and the coolant channels are wholly enclosed within the combustor wall. This latter design is generally preferred over the tube-wall construction although for purposes of this invention they are equivalent. The latter design is also currently employed in the combustor of the Space Shuttle Main Engine (SSME).

In engines such as the SSME, the coolant channels are generally rectangular, with the long axis of the rectangle oriented radially with respect to the axis of the combustor. It has been found that the characteristics of the heat flux through the hot-side surface of the combustor wall renders the most radially outwardly portions of the cooling passages significantly less effective in transferring heat from the combustor wall than the more radially inward portions. This situation, in turn, requires that the hot-side combustor wall be configured to maximize the heat transfer rate at the more radially inwardly portions of the coolant channels. This requirement is especially important in engines of advanced design wherein improved performance is to be effected by increased combustion temperatures and combustion pressures.

When the cooling problem is not properly checked, the roofs of the coolant channels become overheated and begin bowing outwardly from the coolant channels under the force of pressure of the coolant fluid therein. Upon bowing, the hot-side surface of the roofs extend beyond the boundary layer of gases on the hot-side surface of the combustor to become exposed to the rapidly passing combustor gases being ejected from the combustor. As a result, the exposed portions of the affected channel roofs suffer scarfing which rapidly abrades away the exposed portions of the roofs. As portions are eroded away, the roof becomes increasingly weaker and bows more and more until finally the roof breaches. Upon such failure, the coolant channel will leak coolant fluid into the combustion chamber, thereby depriving upstream sections of the combustion adequate coolant flow. If the leaks are severe and/or if they occur in a sufficient number of coolant passages, a horrendous, explosion-type combustor failure will likely occur.

Heretofore, designers have been intent upon trying to overcome the heat flux problem by either increasing the number of coolant channels, or by minimizing the thickness of the portions of the combustor wall between the hot-side surface of the combustor and the coolant channels (hereinafter referred to as the roofs of the coolant channels) or by making the channels as narrow as possible so that the span of the roofs are decreased. All these solutions however have serious shortcomings. If the roofs are made too thin they cannot contain the tremendous pressure of the coolant fluid. If the channels are made too numerous and/or too narrow, the channels take on a highly rectangular shape which severely inhibits the flow of coolant fluid through the channels with the result that, friction within the coolant channels is significantly increased and circulation of cooling fluid at the most radially inward portions of the coolant channels is hampered.

OBJECTS OF THE INVENTION

Consequently, it is an object of the present invention to provide a regeneratively cooled rocket motor combustor which can withstand extreme combustor temperatures and heat-transfer rates while enjoying an extended life-cycle capability.

It is a further object of the present invention to provide a combustor which can withstand extreme temperatures and heat-transfer rates without the roofs of the coolant channels becoming bowed and structurally weakened.

It is yet another object of the present invention to provide a regeneratively cooled rocket combustor having improved cooling effectiveness along the hot-side surface of the combustor wall.

It is still another object of the present invention to provide cooling channels suitable for use in regeneratively cooled rocket combustor which provides interior surfaces configured to improve the transfer of heat to the coolant fluid at the more radially inward portions of the coolant channels.

It is even yet another object of the present invention to provide a combustor wall having cooling channels of sufficient width to maintain favorable flow conditions within the coolant channel and to minimize friction without risk of structure failure in the channel roof.

It is still another object of present invention to provide a regeneratively cooled combustor which is not prone to failure from scarfing.

It is yet another object of the present invention to provide a combustor which include measures for reducing the risk of horrendous, explosion-type combustor failures.

SUMMARY OF THE INVENTION

These and other objects are achieved by the present invention which provides at least one keel-rib extending into each coolant channel from the channel roof and which is bounded on both of its sides by arcuate flutes for providing smooth and continuous surface transition between the keel-rib and adjoining interior surfaces of the coolant channel. By such arrangement, the coolant channel presents an increased amount of surface area at its more radially inward region so that more surface area is presented for transfer of heat. At the same time, the keel-rib and fluted surfaces serve to strengthen the roof against bowing so that the coolant channels can be formed at a greater width than otherwise allowed and so that the channel roofs can withstand high temperatures and heat-transfer rates without any significant risk of structural failure.

Other objects, advantages and novel features of the present invention will become apparent from the following detailed description of the invention when considered in conjunction with the accompanying drawings.

BRIEF DESCRIPTION OF THE DRAWINGS

FIG. 1 is a partially cutaway schematic perspective view of a rocket combustor having keel-rib coolant channels constructed according to the present invention.

FIG. 2 is an enlarged cross-sectional view of a segment of a combustor wall constructed according to the prior art, wherein there is depicted a progression in the typical mode of failure when the figure is viewed from right to left.

FIG. 3 is an enlarged cross-sectional view of a segment of a combustor wall constructed according to the preferred embodiment of the present invention.

The same elements or parts throughout the figures of the drawing are designated by the same reference characters, while equivalent elements of the prior art bear a prime designation.

DETAILED DESCRIPTION OF THE PREFERRED EMBODIMENT

Figure 5:
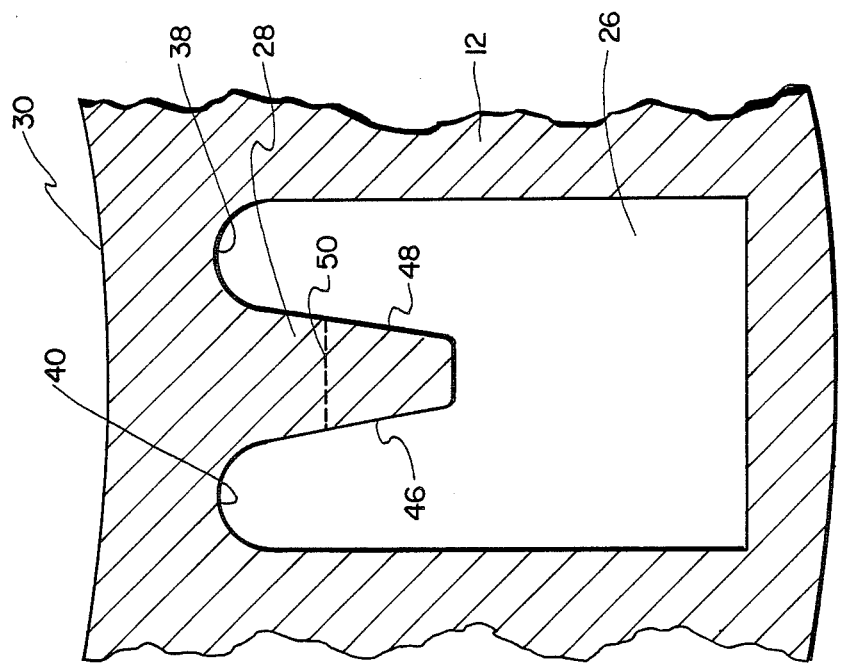
FIG. 5 is an enlarged cross-sectional view of a segment of a combustor wall constructed according to another embodiment of the present invention.

Referring to FIG. 1, there is shown a partially cutaway perspective view of a regeneratively cooled rocket combustor generally designated 10 for a liquid propellant rocket motor. Combustor 10 generally comprises combustor wall 12 which defines combustion chamber 14 and a convergent-divergent nozzle 16. Nozzle 16 converges to its point of greatest constriction at throat nozzle 18 whose location is designated by the dashed oval in FIG. 1. Situated at the exit 20 of nozzle 16 is a manifold 22 having an inlet means 24 for receiving a supply of cryogenic coolant fluid from an appropriate source, which source is not shown. In engines such as the SSME, the coolant fluid is liquid hydrogen, but the type might vary according to the particular engine system.

Extending longitudinally through combustor wall 12 are coolant channels 26 each having a keel-rib 28 constructed according to the present invention. Cooling channels 26 convey coolant fluid from manifold 22 up nozzle 16 and through that portion of combustor wall 12 defining combustion chamber 14, whereupon the coolant fluid is directed towards a fuel injector (not shown) for injection into combustion chamber 14. It is to be noted that FIG. 1 depicts in phantom the path of only one of coolant channels 26 and that it should be understood that the others extend in similar fashion within the length of combustion wall 12. By reason of its passage through the coolant channels, the flow of cryogenic fluid serves to cool combustor wall 12 during firing of the rocket system.

The coolant channel 26', of FIG. 2 is typical of prior art design coolant channels. The prior art design typically envisions a hot-side surface 30' of combustor wall 12' for defining the interior of a combustion chamber 14' and nozzle 16'. The portion of combustion wall 12' situated between cooling channel 26' and hot-side surface 30' is referred to as the roof 32' of cooling channel 26' which is made as short as possible to increase its structural rigidity according to practice of the prior art.

When viewing coolant channels 26', 26'', 26''' and 26'''' of FIG. 2 in progession, one is given a fair and accurate representation of the mode of failure in prior art combustion 10' when combustion temperatures and heat flux go beyond the thermodynamic limitations of prior art combustor 10'. As can be readily perceived, roof 32' tends to bow increasingly as prior art combustor 10' progresses toward rupture, which is depicted in coolant channel 26''''. It should be noted that region 34' of hot-side surface 30' is roughened because of the scarfing action from the extremely rapid flow of combustion gases passing by surface 30'. This scarfing action removes any portions of roofs 32' as they are bowed into the passing combustor flow. As a result, roofs 32' becomes thinner and thinner as they progress towards failure. Normally the boundary layer of gases adjacent to hot-side surface 30' protect roofs 32' from scarfing.

It is to be understood that the cause of failure in prior art combustor 10' of FIG. 2 originates from the need to balance the countervailing design requirements that roofs 32' be made as thin as possible in order to improve the transfer of heat from hot-side surface 30' and that roofs 32' have sufficient structural rigidity to withstand the extreme pressure differential between the flow in coolant channels 26' (at approximately 7000 psia, 150° R) and the hot combustion gases (at approximately 2500 psia, 900°–1000° F.). If roof 32' is made too thick, heat builds up in and around roof 32' and weakens roof 32' such that the prior art combustor wall 12' will progress towards failure. If roof 32' is made thin, heat transfer is improved, but the structural integrity of roof 32' is comprised. Moreover, if the span of roof 32' is shortened significantly in order to strengthen it against bowing, cooling channels 26' becomes so narrow that the flow of coolant fluid is disrupted. As a result, friction in the coolant channels is dramatically increased and the flow no longer favorably impinges upon the most radially inwardly regions 36' of coolant channels 26'. These conditions often occur near or at the combustor throat 18' whereat the coolant channels are most closely arranged.

Referring now to FIG. 3, the present invention provides a solution to these aforementioned problems by providing keel-ribs 28 extending from each respective roof 32 into each cooling channel 26 for providing both structural integrity to roof 32 and for improving the transfer of heat from hot-side surface 30 to the coolant flow in coolant channels 26. The improvement in structural integrity allows for the construction of wider coolant channels 26 even at nozzle throat 18. This further improvement, in turn, improves flow conditions within the coolant channel 26 so that friction is greatly reduced and the most radially inwardly regions 36 of coolant channels 26 are provided with adequate circulation of cooling flow. Moreover, since keel-rib 28 allows for the use of a wider roof 32 and since the interior surface 37 of roof 32 is curved, roof 32 most favorably presents far greater surface are through which heat can be transferred than roof 32' of the prior art.

Figure 4:
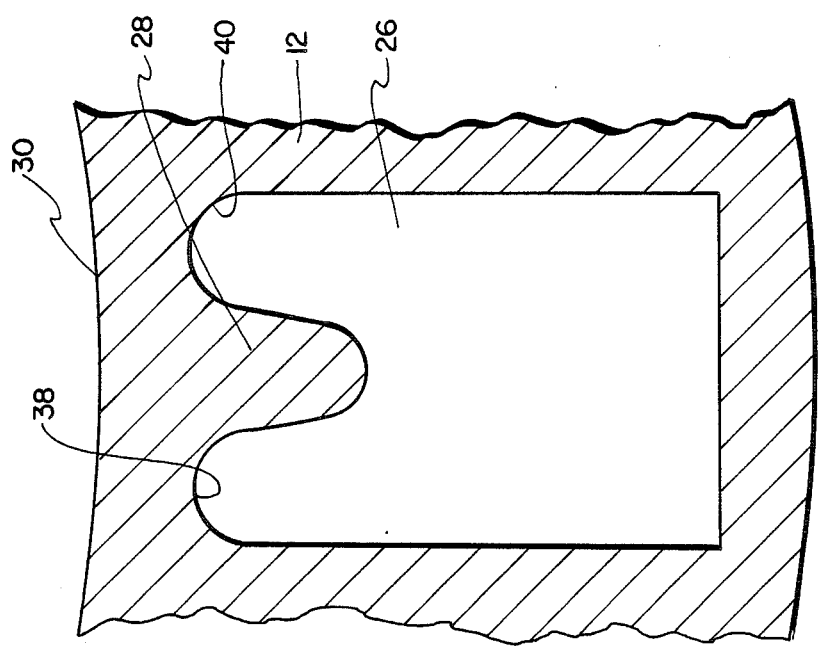
FIG. 4 is a further enlarged cross-sectional view of a segment of a combustor wall constructed according to the preferred embodiment of the present invention.

Keel-ribs 28 preferably extend the entire length of coolant channels 26 and are to be bounded by arcuate flutes 38 and 40 along their entire length for providing smooth and continuous surface transition between each keel-rib 28 and the adjoining interior surfaces 42 and 44 of a respective coolant channel 26. Preferably, keel-ribs 28 are formed integrally with channel roof 32 and given a parabolic cross-section shape as is shown in FIG. 4. Nominally, arcuate flutes would be subscribed by an arc radius of r equalling approximately one-half the width of a keel-rib 28.

Figure 6:
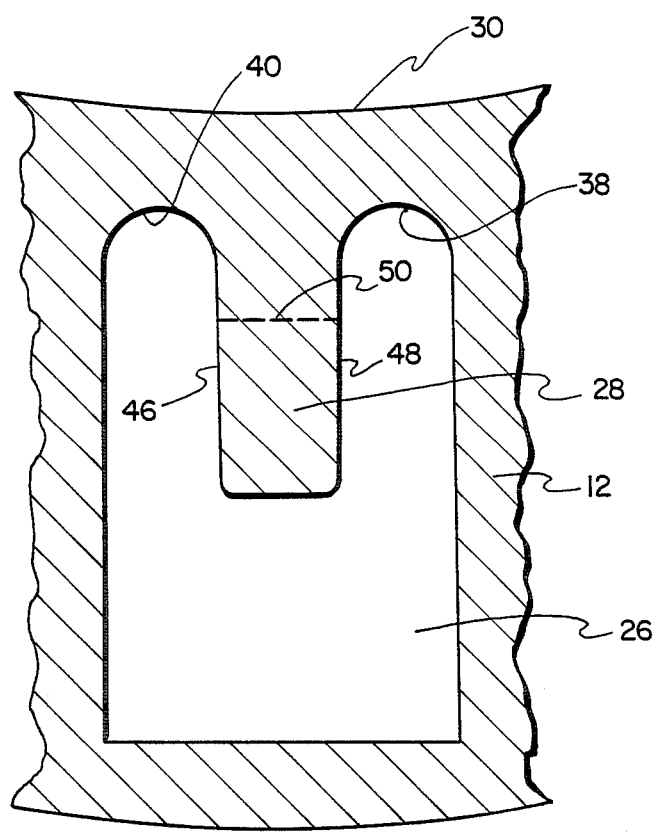
FIG. 6 is an enlarged cross-sectional view of a segment of a combustor wall constructed according to yet another embodiment of the present invention.

In that it is often difficult to manufacture the keel-rib according to the preferred parabolic shape, resort can be had to the alternate embodiment of FIG. 5 which approximates the parabolic shape with convergently tapered walls 46 and 48. In FIG. 6, there is shown another embodiment wherein walls 46 and 48 are aligned parallel for further ease of manufacture. It is to be noted keel-ribs 28 in these embodiments might be extended or shortened according to design requirements. The shortened versions as indicated by the dotted lines 50 in FIGS. 5 and 6 reduce the risk of structural failure over the longer versions and they interfere less with the circulation of coolant fluid in and about arcuate flutes 38 and 40. However, the longer versions provide increased cooling effectiveness.

An optimal length for keel-ribs 28 can be determined analytically by a computer-simulation of combustor wall 12 which calculates local temperatures at variety of points along combustor wall 12 and keel-rib 28. By such analysis, it can be determined the length at which the marginal increase in cooling effectiveness begins to fall off, at which point the design would be set at or near that predetermined length.

Figure 7:
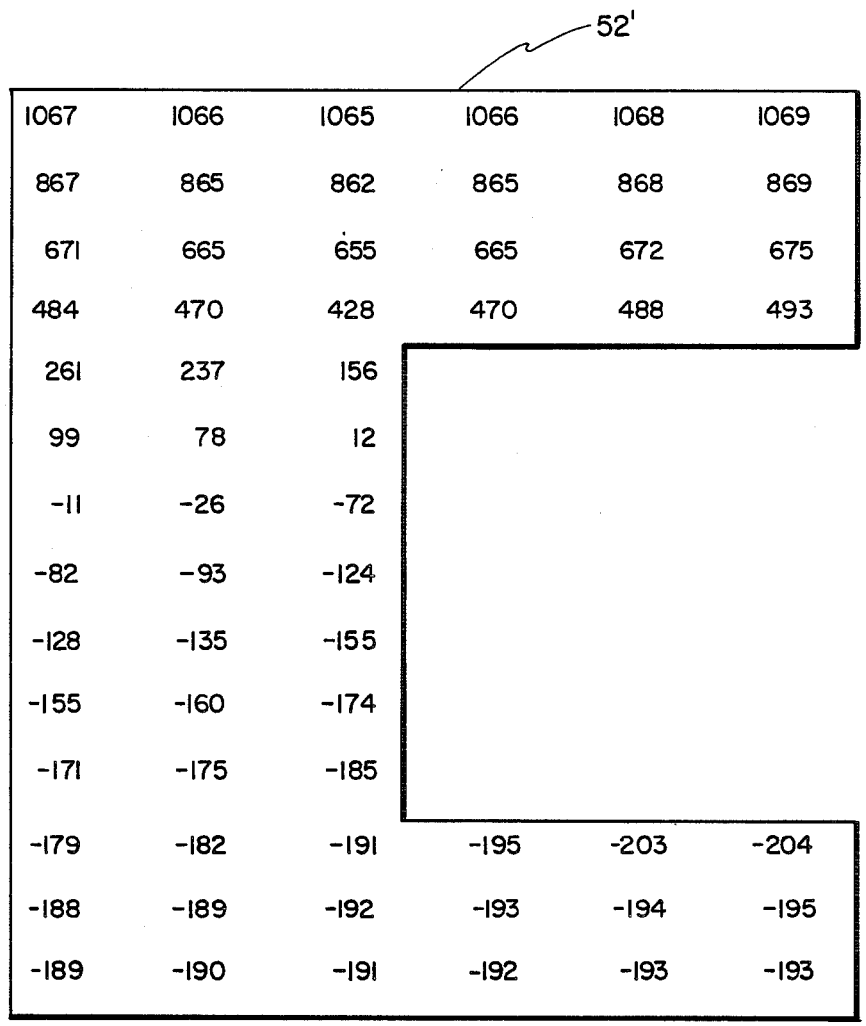
FIG. 7 is a schematic representation of a typical temperature distribution about the cross-section of a combustor wall constructed according to the prior art.
Figures 8, 9:
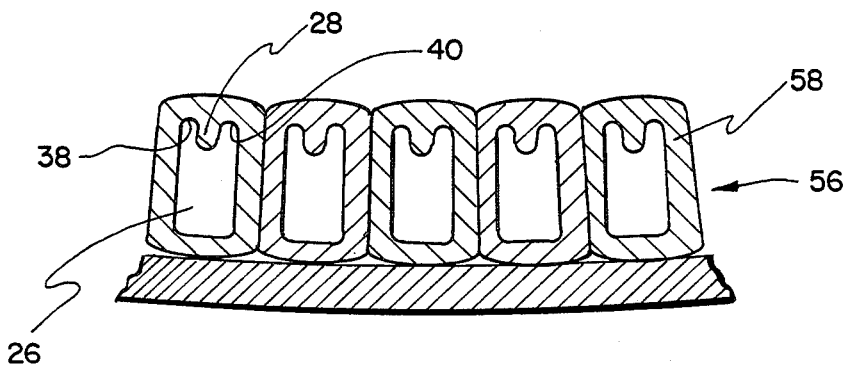
FIG. 8 is a schematic representation of a typical temperature distribution about the cross-section of a combustor wall constructed according to the present invention.
FIG. 9 is a cross-sectional view of a tubular wall combustor constructed according to the present invention.

FIGS. 7 and 8 give schematic representations of the results from using such analytical analysis. FIG. 7 shows a temperature distribution across a prior art combustor wall 12' under typical operating conditions and FIG. 8 shows one that across a combustor wall 12 constructed according to the present invention. It should be noted that the figures show only half of the respective coolant channels 26' and 26 and that designations 52' and 52 indicate the respective locations of the hot-side surfaces 30' and 30 of the respective combustors for purposes of orientation. As can be appreciated, the present invention provides a significant decrease in temperature along hot-side surfaces 30' and 30. Even greater reductions in temperatures can be achieved in other designs.

In FIG. 9 there is shown a tubular wall combustor 56 comprising a plurality of adjoined tubular elements 58 constructed according to the present invention. Therein, keel-rib 28 and arcuate flutes 38 and 40 provide the same advantages in structural integrity and improved cooling effectiveness as is provided in the other embodiments.

Although the present invention has been described with respect to providing a single keel-rib 28, it is well within the contemplation of the present invention to provide a plurality of keel-ribs 28 to each cooling channel 26 although the single keel-rib 28 embodiments are preferred.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. In a regeneratively cooled rocket combustor comprising a wall having a hot-side surface for defining the interior of said combustor, and a plurality of longitudinally extending, spaced apart coolant channels formed within said combustor wall, said coolant channels being substantially rectangular in cross-sectional shape with the long axis of the rectangle oriented radially with respect to the axis of said combustor, each of said coolant channels having interior surfaces and a roof, said roof being formed by the portion of said combustor wall situated between said hot-side surface and said coolant channel; wherein the improvement comprises at least one keel-rib formed within each coolant channel, each said keel-rib extending a minor fraction of the way into said coolant channel from said roof and being bounded by longitudinally extending arcuate flutes for providing smooth and continuous surface transition between said keel-rib and adjoining interior surfaces of said coolant channel, each said keel-rib extending said minor fraction for substantially the entire length of each said coolant channel.

2. The combustor wall as set forth in claim 1 wherein said keel-rib is parabolic in cross-sectional shape.

3. The combustor wall as set forth in claim 1 wherein said keel-rib is formed by convergently tapered walls extending from said roof.

4. The combustor wall as set forth in claim 1 wherein said keel-rib is formed by parallel walls extending from said roof.

* * * * *